(12) United States Patent
Pugel et al.

(10) Patent No.: US 7,454,773 B2
(45) Date of Patent: Nov. 18, 2008

(54) TELEVISION SIGNAL RECEIVER CAPABLE OF RECEIVING EMERGENCY ALERT SIGNALS

(75) Inventors: Michael Anthony Pugel, Noblesville, IN (US); Clint Alan Ecoff, Indianapolis, IN (US); Michael Alan Bridge, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/513,891

(22) PCT Filed: May 8, 2003

(86) PCT No.: PCT/US03/14508

§ 371 (c)(1),
(2), (4) Date: Nov. 9, 2004

(87) PCT Pub. No.: WO03/096693

PCT Pub. Date: Nov. 20, 2003

(65) Prior Publication Data

US 2005/0166221 A1  Jul. 28, 2005

Related U.S. Application Data

(60) Provisional application No. 60/379,447, filed on May 10, 2002, provisional application No. 60/379,445, filed on May 10, 2002.

(51) Int. Cl.
*H04N 7/10* (2006.01)
*H04N 7/025* (2006.01)

(52) U.S. Cl. ............... 725/33; 725/34; 725/35; 348/731

(58) Field of Classification Search ............ 725/32, 725/33, 35, 131, 132, 139, 140, 151, 152, 725/34; 348/731, 729, 725, 563, 565
See application file for complete search history.

(56) References Cited

U.S. PATENT DOCUMENTS

| | | | |
|---|---|---|---|
| 3,975,583 A | 8/1976 | Meadows | |
| 4,155,042 A | 5/1979 | Permut et al. | |
| 5,121,430 A | 6/1992 | Ganzer et al. | |
| 5,565,909 A * | 10/1996 | Thibadeau et al. ............ 725/35 |

(Continued)

FOREIGN PATENT DOCUMENTS

JP  62086925 A  4/1987

(Continued)

OTHER PUBLICATIONS

Search Report dated Jul. 2, 2003.

(Continued)

*Primary Examiner*—Ngoc K Vu
(74) *Attorney, Agent, or Firm*—Joseph J. Laks; Robert D. Shedd

(57) ABSTRACT

A television signal processing apparatus is capable of receiving emergency alert signals and providing alert outputs to notify individuals of emergency events. According to one exemplary embodiment, the television signal processing apparatus includes a tuner operative to tune a frequency including emergency alert signals indicating an emergency event. A processor is operative to cause the television signal processing apparatus to be switched from an off/standby mode to an on mode responsive to the emergency alert signals.

36 Claims, 4 Drawing Sheets

U.S. PATENT DOCUMENTS

| | | | |
|---|---|---|---|
| 5,701,161 | A | 12/1997 | Williams et al. |
| 6,177,873 | B1 | 1/2001 | Cragun |
| 6,204,761 | B1 | 3/2001 | Vanderable |
| 6,320,623 | B1 * | 11/2001 | Cavallerano et al. ........ 348/553 |
| 2003/0093580 | A1 * | 5/2003 | Thomas et al. .............. 709/318 |
| 2003/0093789 | A1 * | 5/2003 | Zimmerman et al. .......... 725/34 |
| 2003/0121054 | A1 * | 6/2003 | Lorenz ....................... 725/112 |
| 2003/0169366 | A1 * | 9/2003 | Lenzi et al. ................. 348/461 |
| 2004/0128682 | A1 * | 7/2004 | Liga et al. .................... 725/35 |
| 2005/0015803 | A1 * | 1/2005 | Macrae et al. ................ 725/41 |

FOREIGN PATENT DOCUMENTS

| | | |
|---|---|---|
| WO | WO 01/33853 | 5/2001 |
| WO | WO 01/45386 | 6/2001 |
| WO | WO 01/50739 | 7/2001 |

OTHER PUBLICATIONS

Patent Abstracts of Japan, vol. 0112, No. 88, Sep. 17, 1987.
EP Search Report dated Apr. 27, 2005.

* cited by examiner

TELEVISION SIGNAL RECEIVER CAPABLE OF RECEIVING EMERGENCY ALERT SIGNALS

CROSS REFERENCE TO RELATED APPLICATIONS

This application claims the benefit, under 35 U.S.C. § 365 of International Application PCT/US03/14508, filed May 8, 2003, which was published in accordance with PCT Article 21(2) on Nov. 20, 2003 in English and which claims the benefit of U.S. provisional patent application No. 60/379, 445, filed May 10, 2002 and U.S. provisional patent application No. 60/379,447, filed May 10, 2002.

BACKGROUND OF THE INVENTION

1. Field of the Invention

The present invention generally relates to television signal processing systems, and more particularly, to television signal processing systems capable of, among other things, receiving a signal indicating an emergency event and providing alert outputs to notify individuals of emergency events.

2. Background Information

Emergency events such as severe weather, natural disasters, fires, civil emergencies, war acts, toxic chemical spills, radiation leaks, or other such conditions can be devastating to unprepared individuals. With weather-related emergencies, authorities such as the National Weather Service (NWS) and the National Oceanographic and Atmospheric Administration (NOAA) are generally able to detect severe weather conditions prior to the general public. Through the use of modern weather detection devices, such as Doppler radar and weather satellites, the NWS and NOAA are able to issue early warnings of severe weather conditions which have saved many lives. However, for such warnings to be effective, they must be communicated to their intended recipients.

Certain specialized radios and scanners are capable of receiving emergency alert signals provided by the NWS and NOAA. However, such devices tend to be dedicated to this use, and generally offer consumers little, if any, functionality beyond monitoring these signals. Accordingly, in order to receive advance warning of weather-related emergencies, consumers are required to purchase a separate, dedicated device, which may be cost-prohibitive to some consumers.

Accordingly, there is a need for a device capable of receiving emergency alert signals which avoids the foregoing problems. The present invention addresses these and other issues.

SUMMARY OF THE INVENTION

In accordance with an aspect of the present invention, a television signal processing system for providing an emergency alert function is disclosed. According to an exemplary embodiment, the television signal processing system comprises tuning means for tuning a frequency including a signal indicating an emergency event. Processing means cause the television signal processing system to be switched from a first mode to a second mode responsive to the signal indicating the emergency event.

In accordance with another aspect of the present invention, a television signal processor for providing an emergency alert function comprises first and second tuning means. According to an exemplary embodiment, the television signal receiver comprises first tuning means for tuning a first frequency including a signal indicating an emergency event while the television signal processor is in a first mode. Second tuning means tunes a second frequency including a signal indicating an emergency event while the television signal receiver is in an on mode. Processing means enables an alert output responsive to the signal indicating an emergency event.

In accordance with yet another aspect of the present invention, a method for controlling a television signal processor providing an emergency alert function is disclosed. According to an exemplary embodiment, the method comprises steps of using a tuner of the television signal processor to tune a frequency including a signal indicating an emergency event, and switching the television signal receiver from a first mode to a second mode responsive to the signal indicating an emergency event.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
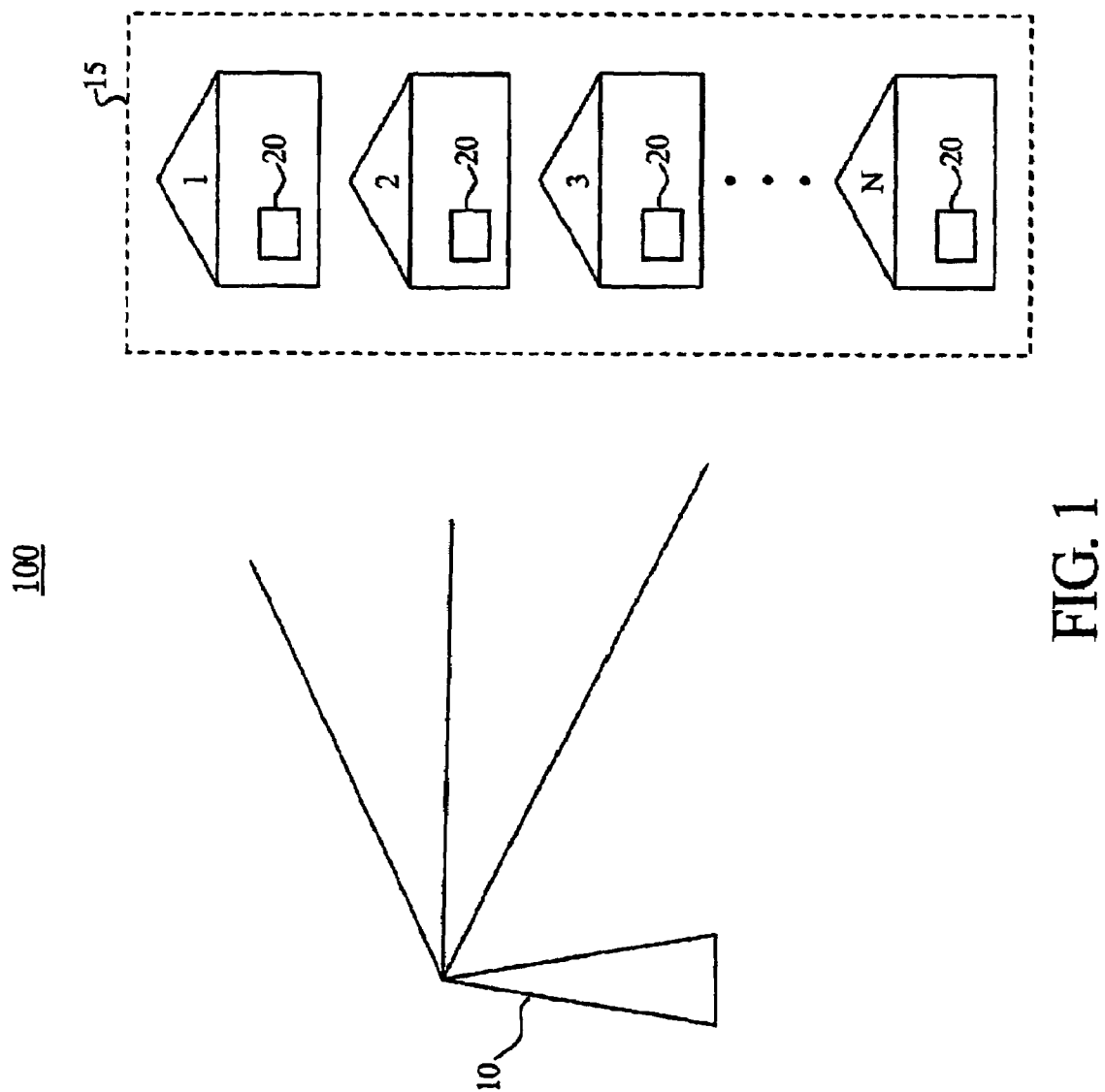
FIG. 1 is an exemplary environment suitable for implementing the present invention.

Referring now to the drawings, and more particularly to FIG. 1, an exemplary environment 100 suitable for implementing the present invention is shown. In FIG. 1, environment 100 comprises a signal transmission source 10 and dwelling units 15 (i.e., 1, 2, 3 . . . N, where N may be any positive integer). Dwelling units 15 in FIG. 1 may for example represent residences, businesses and/or other dwelling places located within a particular geographical area, such as but not limited to, a particular continent, country, region, state, area code, zip code, city, county, municipality, subdivision, and/or other definable geographical area. According to an exemplary embodiment, each of the dwelling units 15 is equipped with at least one television signal processor or system, e.g., television signal receiver 20, capable of receiving emergency alert signals and providing alert outputs to notify individuals of emergency events.

The television signal processing system may comprise various types of systems or signal processors such as television signal receivers that include a display device (such as a television set) or television signal receivers that do not include a display device (such as a set top box or VCR) but produce a signal suitable for coupling to a display device. For the purposes of the following detailed description, an exemplary embodiment of a system incorporating principles of the invention will be described in the context of a television receiver that includes a display device. However, the described aspects of the invention are also applicable to other types of television signal processing systems such as those that do not include a display device.

According to an exemplary embodiment, signal transmission source 10 transmits signals including a signal indicating an emergency event, e.g., emergency alert signals, which may be received by each television signal receiver 20. The emergency alert signals may be provided from an authority such as the NWS, or other authorities such as governmental entities or the like. In response to the emergency alert signals, each television signal receiver 20 may perform an emergency alert function by providing one or more alert outputs to thereby notify individuals of the emergency event. Signal transmission source 10 may, for example, transmit such emergency alert signals to television signal receivers 20 via any wired or wireless medium such as, but not limited to, terrestrial, cable, satellite, fiber optic, digital subscriber line ("DSL"), and/or other type of broadcast and/or multicast means.

Figure 2:
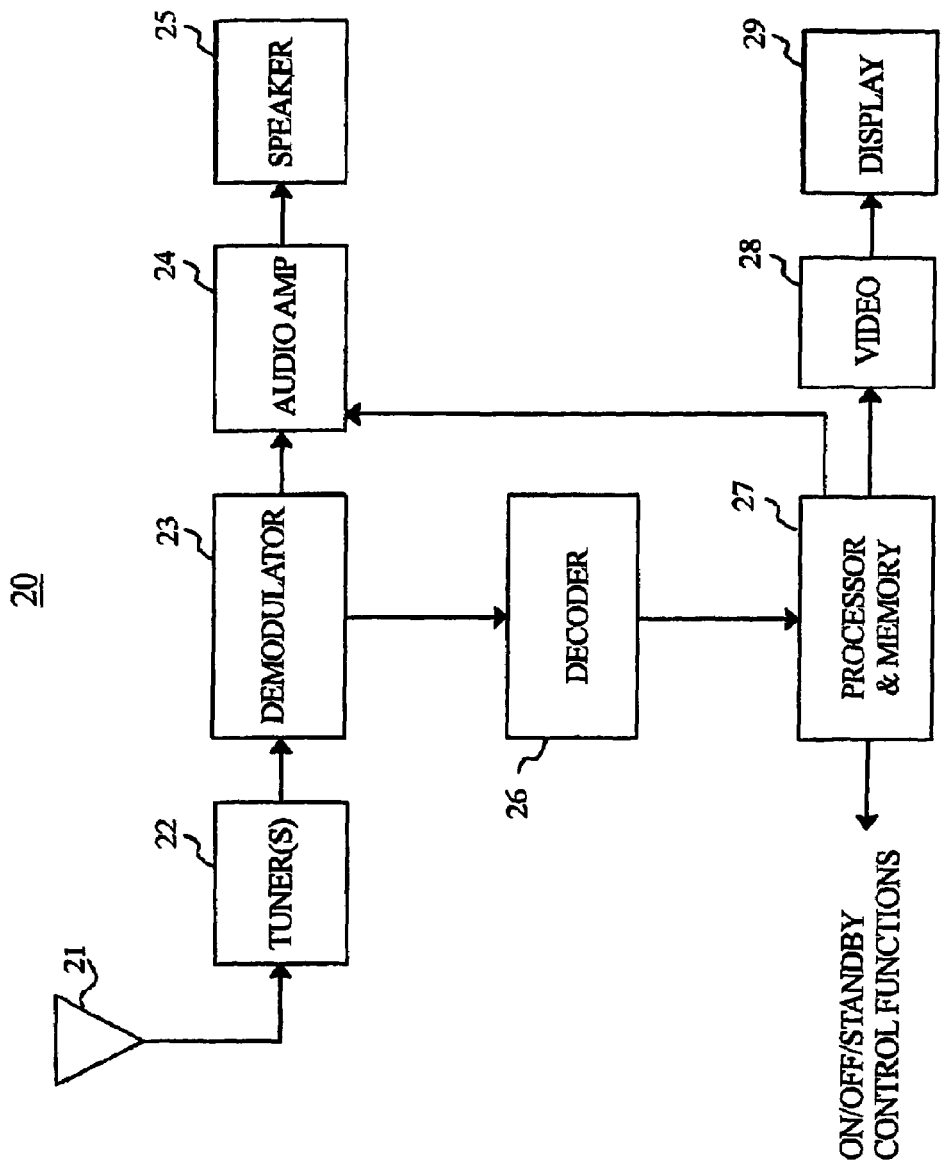
FIG. 2 is a block diagram of a television signal processing system suitable for implementing the present invention.

Referring now to FIG. 2, further exemplary details regarding each television signal receiver 20 of FIG. 1 will now be provided. In particular, FIG. 2 is a block diagram of a television signal receiver 20 suitable for implementing the present invention. In FIG. 2, television signal receiver 20 comprises a signal receiving element 21, one or more tuners 22, a demodulator 23, an audio amplifier 24, a speaker 25, a decoder 26, a processor and memory 27, a video processor 28, and a display 29. Some of the foregoing elements may for example be embodied using integrated circuits (ICs). For clarity of description, certain conventional elements of television signal receiver 20 may not be shown in FIG. 2.

Signal receiving element 21 is operative to receive signals including audio and/or video signals from signal sources, such as signal transmission source 10 in FIG. 1. According to an exemplary embodiment, received signals, e.g., audio signals, may include a signal indicating an emergency event, e.g., digitally encoded emergency alert signals. Signal receiving element 21 may be embodied as any signal receiving element such as an antenna, input terminal or other element.

One or more tuners 22 are operative to tune signals including audio and/or video signals. According to an exemplary embodiment, the one or more tuners 22 are capable of tuning audio signals on at least the following designated NWS frequencies: 162.400 MHz, 162.425 MHz, 162.450 MHz, 162.475 MHz, 162.500 MHz, 162.525 MHz and 162.550 MHz. Other frequencies may also be tuned. As previously indicated herein, such audio signals may include digitally encoded emergency alert signals. According to an exemplary embodiment, television signal receiver 20 may include a picture-in-picture (PIP) function wherein a first tuner 22 operates as a main tuner for a main picture, and a second tuner 22 operates as a secondary tuner for the PIP. According to this exemplary embodiment, when television signal receiver 20 is operating in one mode, e.g., in an on mode, first tuner 22 tunes audio and/or video signals in a conventional manner, and second tuner 22 tunes a frequency including emergency alert signals, such as one of the NWS frequencies (when not in use for the PIP function). Conversely, when television signal receiver 20 is in a second mode, e.g., an off/standby mode, first tuner 22 tunes a frequency including emergency alert signals. In this manner, emergency alert signals may be received when television signal receiver 20 is in various modes of operation, e.g., the on mode of operation and the off/standby mode of operation. Further details regarding this aspect of the present invention will be provided later herein.

Demodulator 23 is operative to demodulate signals provided from tuner(s) 22. According to an exemplary embodiment, demodulator 23 demodulates audio signals to thereby generate demodulated audio signals representing audio content such as an NWS audio message, a warning alert tone and/or other audio content. Audio amplifier 24 is operative to amplify the audio signals output from demodulator 23 responsive to a control signal provided from processor 27. Speaker 25 is operative to aurally output the amplified audio signals provided from audio amplifier 24.

Decoder 26 is operative to decode signals including audio and/or video signals. According to an exemplary embodiment, decoder 26 decodes audio signals provided from demodulator 23 to thereby extract digitally encoded frequency shift keyed (FSK) signals, which represent emergency alert signals indicating an emergency event. According to this exemplary embodiment, the emergency alert signals include data comprising specific area message encoding (SAME) data associated with the emergency event. SAME data comprises a digital code representing information such as the specific geographical area affected by the emergency event, the type of emergency event (e.g., tornado, toxic chemical spill, radiation leak, civil emergency, etc.), and the expiration time of the event alert. SAME data is used by the NWS and other authorities to improve the specificity of emergency alerts and to decrease the frequency of false alerts. Other data and information may also be included in the emergency alert signals according to the present invention.

Processor and memory 27 are operative to perform various processing and data storage functions of television signal receiver 20. According to an exemplary embodiment, processor 27 receives the emergency alert signals from decoder 26 and determines whether the emergency alert function of television signal receiver 20 is activated based on data included in the emergency alert signals. According to this exemplary embodiment, processor 27 compares data in the emergency alert signals to user setup data stored in memory 27 to determine whether the emergency alert function is activated. As will be described later herein, a setup process for the emergency alert function of television signal receiver 20 allows a user to select items such as an applicable geographical area(s), and type(s) of emergency events (e.g., tornado, toxic chemical spill, radiation leak, civil emergency, etc.) which activate the emergency alert function. According to an exemplary embodiment, when the emergency alert function is activated, processor 27 outputs one or more control signals which cause television signal receiver 20 to be switched from a first mode, e.g., the off/standby mode, to a second mode, e.g., the on mode, and also enable one or more alert outputs to thereby notify individuals of the emergency event. Further details regarding such functions will be provided later herein.

Video processor 28 is operative to process signals including video signals. According to an exemplary embodiment, such video signals may include embedded messages such as NWS text messages and/or other messages that provide details regarding emergency events. Video processor 28 may include closed caption circuitry which enables closed caption displays. Display 29 is operative to provide visual displays corresponding to processed signals provided from video processor 28. According to an exemplary embodiment, display 29 may provide visual displays including the aforementioned messages that provide details regarding emergency events.

Figure 3:
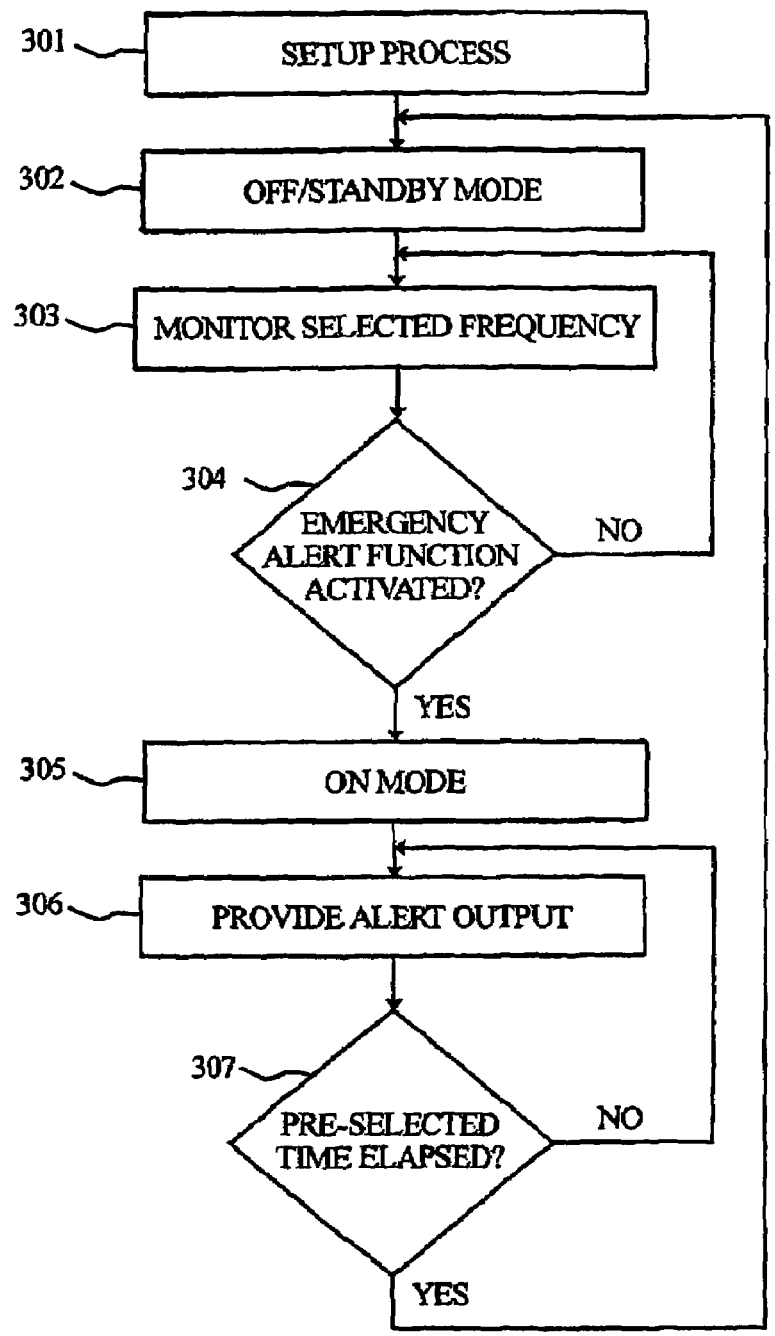
FIG. 3 is a flowchart illustrating exemplary steps according to an aspect of the present invention.

Turning now to FIG. 3, a flowchart 300 illustrating exemplary steps according to an aspect of the present invention is shown. For purposes of example and explanation, the steps of FIG. 3 will be described with reference to television signal receiver 20 of FIG. 2. The steps of FIG. 3 are merely exemplary, and are not intended to limit the present invention in any manner.

At step 301, a setup process for the emergency alert function of television signal receiver 20 is performed. According to an exemplary embodiment, a user performs this setup process by providing inputs to television signal receiver 20

(e.g., using a remote control device not shown) responsive to an on-screen menu displayed via display 29. Such an on-screen menu may for example be part of an electronic program guide (EPG) function of television signal receiver 20. According to an exemplary embodiment, the user may select at least the following items during the setup process at step 301:

A. Enable/Disable—The user may select whether to enable or disable the emergency alert function.
B. Frequency Selection—The user may select the monitoring frequency to tune to in order to receive emergency alert signals. For example, the user may select a frequency such as one of the following NWS frequencies: 162.400 MHz, 162.425 MHz, 162.450 MHz, 162.475 MHz, 162.500 MHz, 162.525 MHz and 162.550 MHz.
C. Event Types—The user may select one or more types of emergency events which activate the emergency alert function. For example, the user may designate that events such as civil emergencies, acts of war, and/or tornado warnings activate the emergency alert function, but that events such as thunderstorm warnings do not, etc. The user may also select whether the conventional warning audio tone provided by the NWS and/or other alert mechanism activates the emergency alert function. According to the present invention, different severity levels may represent different "events." For example, a thunderstorm watch may be considered a different event from a thunderstorm warning.
D. Geographical Areas—The user may select one or more geographical areas of interest. For example, the user may select a particular continent, country, region, state, area code, zip code, city, county, municipality, subdivision, and/or other definable geographical area.
E. Alert Outputs—The user may select one or more alert outputs to be provided when the emergency alert function is activated. For example, the user may select to aurally output a warning tone and/or an NWS audio message, and the desired volume of each. The user may also select to display an NWS text message (e.g., as a closed caption message) and/or to tune television signal receiver 20 to a specific channel. Other types of alert outputs may also be provided according to the present invention.
F. Duration of Alert Outputs—The user may select a predetermined time period for which the one or more alert outputs will be provided when the emergency alert function is activated. After this predetermined time period elapses, the one or more alert outputs cease (at least temporarily), and television signal receiver 20 switches from the on mode to the off/standby mode.
G. Time Period Between Repeat Events—The user may select a predetermined time period for repeat events. For example, after television signal receiver 20 provides an alert output for a particular emergency event and switches to the off/standby mode (as described in item F above), the emergency alert function will not be activated again for this same emergency event until after the predetermined time period for repeat events elapses. As previously indicated herein, different severity levels may represent different events.

Other menu selections may also be provided at step 301 according to the present invention. Data corresponding to the user's selections during the setup process of step 301 is stored in memory 27.

At step 302, television signal receiver 20 is switched from one mode, e.g., the on mode to another mode, e.g., the off/standby mode. According to an exemplary embodiment, the on mode is an operational mode where television signal receiver 20 is turned on (i.e., providing audio and/or video outputs), while the off/standby mode is an operational mode where television signal receiver 20 is turned off (i.e., no audio and/or video outputs) but still receives electrical power. Television signal receiver 20 may for example be switched to the off/standby mode at step 302 responsive to a user input.

At step 303, television signal receiver 20 monitors the frequency selected by the user during the setup process of step 301 (i.e., item B) for emergency alert signals. According to an exemplary embodiment, tuner 22 monitors the selected frequency while television signal receiver 20 is in the off/standby mode and thereby receives incoming emergency alert signals.

At step 304, a determination is made as to whether the emergency alert function of television signal receiver 20 is activated. According to an exemplary embodiment, processor 27 makes this determination by comparing data included in the incoming emergency alert signals to data stored in memory 27 from the setup process of step 301. As previously indicated herein, the emergency alert signals may include SAME data which represents information including the type of emergency event (e.g., tornado, toxic chemical spill, radiation leak, civil emergency, etc.) and the specific geographical area(s) affected by the emergency event. According to an exemplary embodiment, processor 27 compares this SAME data to the corresponding data from the setup process of step 301 (i.e., items C and D) stored in memory 27 to thereby determine whether the emergency alert function is activated. In this manner, the emergency alert function of television signal receiver 20 is activated only when the emergency event indicated by the emergency alert signals corresponds to the geographical area(s) and event type(s) designated by the user at step 301.

If the determination at step 304 is negative, process flow loops back to step 303 where tuner 22 continues to monitor the selected frequency. Alternatively, if the determination at step 304 is positive, process flow advances to step 305 where television signal receiver 20 switches to the on mode. According to an exemplary embodiment, processor 27 outputs one or more control signals which cause television signal receiver 20 to be switched from the off/standby mode to the on mode.

At step 306, television signal receiver 20 provides an alert output to thereby notify individuals of the emergency event. According to an exemplary embodiment, processor 27 enables one or more alert outputs in accordance with the user's selections during the setup process of step 301 (i.e., item E). For example, an aural output such as a warning tone and/or an NWS audio message may be output via speaker 25. Processor 27 may output a control signal to audio amplifier 24 to control the volume of such aural outputs in accordance with the volume level set by the user during the setup process of step 301. Visual outputs may also be provided at step 306 via display 29 to notify individuals of the emergency event. For example, a visual output such as an NWS text message (e.g., as a closed caption message) and/or a video output from a specific channel may also be provided. Other types of alert outputs may also be provided at step 306 according to the present invention.

At step 307, a determination is made as to whether the alert output has been provided for a pre-selected time period. As previously indicated herein, the user may designate this time period during the setup process at step 301 (i.e., item F). If the determination at step 307 is negative, process flow loops back to step 306 where television signal receiver 20 continues to provide an alert output. Alternatively, if the determination at step 307 is positive, process flow loops back to step 302 where television signal receiver 20 switches back to the off/standby mode. According to an exemplary embodiment, processor 27 outputs one or more control signals which cause television signal receiver 20 to be switched back to the off/standby mode at step 302. In this manner, television signal receiver 20 provides the alert output for only the pre-selected period of time specified by the user during the setup process at step 301.

After television signal receiver 20 switches back to the off/standby mode at step 302, it continues to monitor the selected frequency and receive incoming emergency alert signals at step 303. However, according to an exemplary embodiment, the emergency alert function may not be activated again for the same emergency event (i.e., a repeat event) for a predetermined time period. As previously indicated herein, the user may select this predetermined time period for repeat events during the setup process of step 301 (i.e., item G), and different severity levels may represent different events. Accordingly, processor 27 disables the emergency alert function for a repeat emergency event for the predetermined time period specified by the user. In this manner, television signal receiver 20 will not provide an alert output again for the same emergency event until after this predetermined time period elapses.

Figure 4:
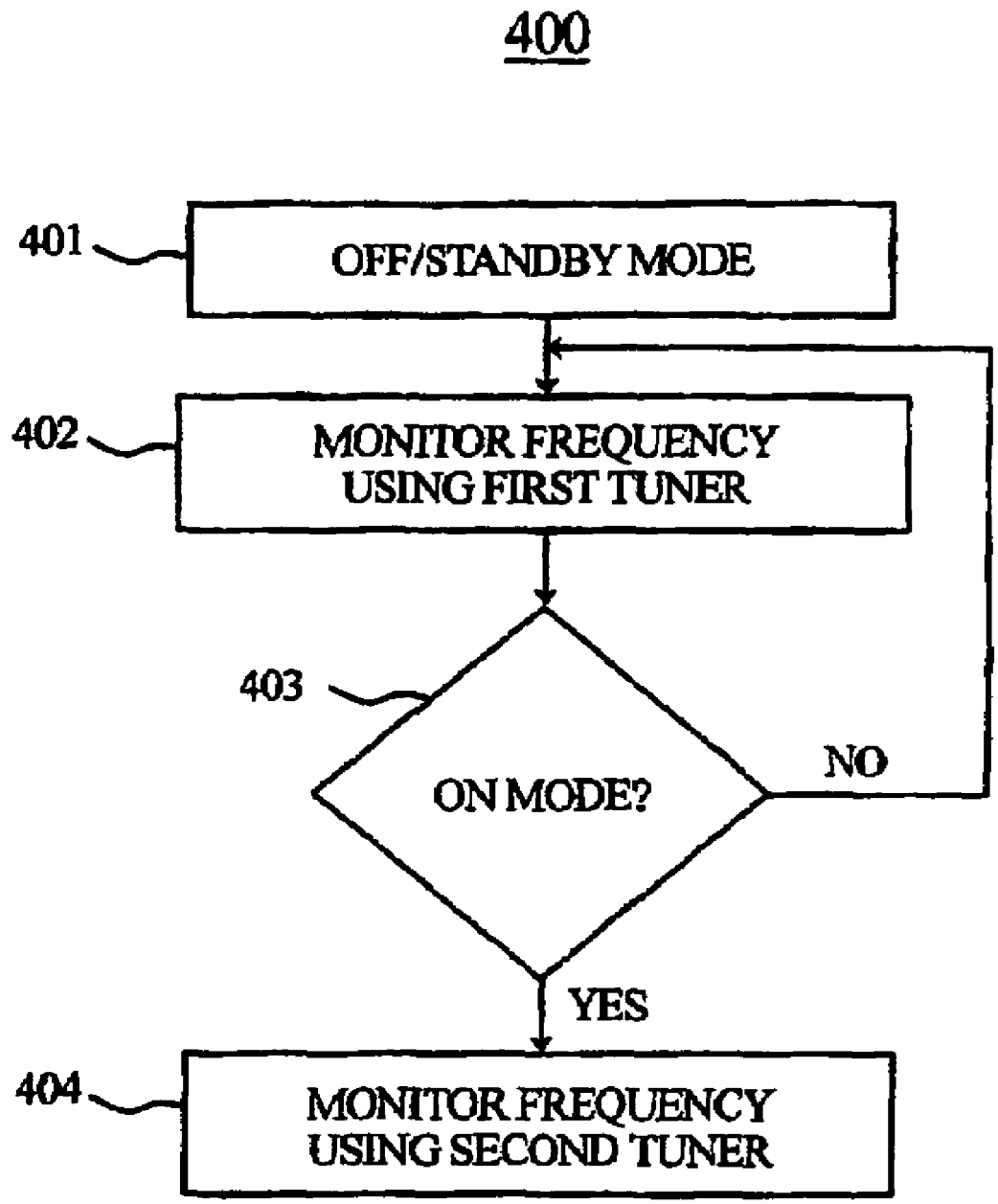
FIG. 4 is a flowchart illustrating exemplary steps according to another aspect of the present invention.

Turning now to FIG. 4, a flowchart 400 illustrating exemplary steps according to another aspect of the present invention is shown. In particular, FIG. 4 illustrates how television signal receiver 20 may monitor frequencies for emergency alert signals using two tuners 22. The principles and steps of FIG. 4 may be combined with the principles and steps of FIG. 3. The steps of FIG. 4 are merely exemplary, and are not intended to limit the present invention in any manner.

At step 401, television signal receiver 20 is switched to the off/standby mode. Television signal receiver 20 may for example be switched to the off/standby mode at step 401 responsive to a user input.

At step 402, television signal receiver 20 monitors a frequency for emergency alert signals using a first tuner 22. As previously indicated herein, television signal receiver 20 may include a PIP function wherein a first tuner 22 operates as a main tuner for a main picture, and a second tuner 22 operates as a secondary tuner for the PIP. Accordingly, at step 402, first tuner 22 monitors a frequency such as an NWS frequency while television signal receiver 20 is in a first mode, e.g., the off/standby mode. This frequency may for example be selected by a user during a setup process for the emergency alert function of television signal receiver 20, such as the one described above in step 301 of FIG. 3.

At step 403, television signal receiver 20 detects when it is switched to a second mode, e.g., the on mode. According to an exemplary embodiment, first tuner 22 continues to monitor a frequency for emergency alert signals while television signal receiver 20 is in the off/standby mode, as indicated by looping steps 402 and 403 in FIG. 4. However, when television signal receiver 20 is switched to the on mode, process flow advances to step 404 where television signal receiver 20 monitors a frequency for emergency alert signals using second tuner 22, and first tuner 22 tunes audio and/or video signals in a conventional manner to thereby provide audio and/or video outputs. The frequencies monitored by the first and second tuners 22 at steps 402 and 404 may be different frequencies, or the same frequency, and may for example be designated by a user. When second tuner 22 is used for a PIP function, it may monitor a frequency for emergency alert signals at step 404 whenever the PIP function is not used. In this manner, emergency alert signals may be received when television signal receiver 20 is in both first and second modes, e.g., the on mode, and the off/standby mode.

As described herein, the present invention provides a television signal receiver capable of receiving emergency alert signals and providing alert outputs to notify individuals of emergency events. The present invention may be applicable to various apparatuses, either with or without a display device. Accordingly, the phrase "television signal receiver" as used herein may refer to systems or apparatuses capable of receiving and processing television signals including, but not limited to, television sets, computers or monitors that include a display device, and systems or apparatuses such as set-top boxes, video cassette recorders (VCRs), digital versatile disk (DVD) players, video game boxes, personal video recorders (PVRs), computers or other apparatuses that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. Television signal processing apparatus comprising:
a first tuner operative to tune a first signal indicating a first emergency event while the television signal processing apparatus is in a first off/standby mode,
a second tuner operative to tune said first signal indicating a first emergency event while the television signal processing apparatus is in a second on mode, and
a processor operative to cause the television signal processing apparatus to switch from said first off/standby mode, in which the first tuner tunes said first signal indicating an emergency event, to said second on mode, in which said first tuner tunes a second signal having at least one of an audio and video component and the second tuner tunes the first signal for indicating an emergency event.

2. The television signal processing apparatus of claim 1, wherein the processor causes the television signal processing apparatus to be switched from the first off/standby mode to the second on mode in response to the first emergency event corresponding to an event selectable by a user.

3. The television signal processing apparatus of claim 1, wherein the processor causes the television signal processing apparatus to be switched from the first off/standby mode to the second on mode in response to the first emergency event corresponding to a geographical area selectable by a user.

4. The television signal processing apparatus of claim 1, wherein the processor is further operative to enable an alert output responsive to the first signal for indicating an emergency event.

5. The television signal processing apparatus of claim 4, wherein the processor enables the alert output in response to the first signal for indicating an emergency event corresponding to an event selectable by a user.

6. The television signal processing apparatus of claim 4, wherein the processor enables the alert output in response to the first signal for indicating an emergency event corresponding to a geographical area selectable by a user.

7. The television signal processing apparatus of claim 4, wherein the processor enables the alert output responsive to a user selection.

8. The television signal processing apparatus of claim 4, further comprising a speaker, and wherein the alert output comprises an aural message provided via the speaker.

9. The television signal processing apparatus of claim 4, further comprising a display, and wherein the alert output comprises a visual message provided via the display.

10. The television signal processing apparatus of claim 4, wherein the processor enables the alert output for a first time period selectable by a user.

11. The television signal processing apparatus of claim 10, wherein the processor causes the television signal processing apparatus to be switched from the second on mode to the first off/standby mode in response to the alert output being provided for the first time period.

12. The television signal processing apparatus of claim 11, wherein the processor disables the emergency alert function for a repeat emergency event for a second time period selectable by a user in response to the television signal processing apparatus being switched from the second on mode to the first off/standby mode.

13. A television signal receiver having an emergency alert function, comprising:
   first tuning means for tuning first emergency alert signals indicating a first emergency event while the television signal receiver is in a first off/standby mode;
   second tuning means for tuning said first emergency alert signals indicating a first emergency event while the television signal receiver is in a second on mode; and
   processing means for causing the television signal receiver to switch from said first off/standby mode, in which the first tuning means tunes said first emergency alert signal indicating a first emergency event, to said second on mode, in which said first tuner tunes a second signal having at least one of an audio and video component and the second tuning means tunes the first emergency alert signals.

14. The television signal receiver of claim 13, wherein the processing means causes the television signal receiver to be switched from the first off/standby mode to the second on mode when the first emergency event corresponds to an event selectable by a user.

15. The television signal receiver of claim 13, wherein the processing means causes the television signal receiver to be switched from the first off/standby mode to the second on mode when the first emergency event corresponds to a geographical area selectable by a user.

16. The television signal receiver of claim 13, wherein the processing means further enables an alert output responsive to at least one of the first emergency alert signal and a second emergency alert signal.

17. The television signal receiver of claim 16, wherein the processing means enables the alert output if at least one of the emergency event and a second emergency event corresponds to an event selectable by a user.

18. The television signal receiver of claim 16, wherein the processing means enables the alert output if at least one of the first emergency event and a second emergency event corresponds to a geographical area selectable by a user.

19. The television signal receiver of claim 16, wherein the processing means enables the alert output responsive to a user selection.

20. The television signal receiver of claim 16, further comprising audio output means for providing the alert output as an aural message.

21. The television signal receiver of claim 16, further comprising display means for providing the alert output as a visual message.

22. The television signal receiver of claim 16, wherein the processing means enables the alert output for a first time period selectable by a user.

23. The television signal receiver of claim 22, wherein the processing means causes the television signal receiver to be switched from the second on mode to the first off/standby mode after the alert output is provided for the first time period.

24. The television signal receiver of claim 23, wherein the processing means disables the emergency alert function for a repeat emergency event for a second time period selectable by a user after the television signal receiver is switched from the second on mode to the first off/standby mode.

25. Television signal processing apparatus comprising:
   first tuning means for tuning a first frequency including a first signal indicating a first emergency event while the television signal processing apparatus is in a first off/standby mode;
   second tuning means for tuning said first frequency including said first signal indicating a second emergency event while the television signal processing apparatus is in a second on mode; and
   processing means for enabling an alert output, wherein the television signal processing apparatus is switched from the first off/standby mode, in which the first tuning means tunes said first frequency including said first signal indicating a first emergency event, to said second on mode, in which said first tuning means tunes a second frequency including a second signal having at least one of an audio and video component and the second tuning means tunes said first frequency including said first signal indicating a second emergency event.

26. The television signal processing apparatus of claim 25, wherein the first and second frequencies are the same.

27. The television signal processing apparatus of claim 25, wherein the first and second frequencies are different.

28. The television signal processing apparatus of claim 25, wherein the processing means enables the alert output in response to at least one of the first emergency event and the second emergency event corresponding to an event selectable by a user.

29. The television signal processing apparatus of claim 25, wherein the processing means enables the alert output in response to at least one of the first emergency event and the second emergency event corresponding to a geographical area selectable by a user.

30. The television signal processing apparatus of claim 25, wherein the processing means enables the alert output for a first time period selectable by a user.

31. The television signal processing apparatus of claim 30, wherein the processing means causes the television signal processing apparatus to be switched from the second on mode to the first off/standby mode after the alert output is provided for the first time period.

32. The television signal processing apparatus of claim 31, wherein the processing means disables the emergency alert function for a repeat emergency event for a second time period selectable by a user in response to the television signal processing apparatus being switched from the second on mode to the first off/standby mode.

33. The television signal processing apparatus of claim 25, wherein the processing means causes the television signal processing apparatus to be switched from the first off/standby mode to the second on mode in response to the first emergency event corresponding to an event selectable by a user.

34. The television signal processing apparatus of claim 25, wherein the processing means causes the television signal processing apparatus to be switched from the first off/standby mode to the second on mode in response to the first emergency event corresponding to a geographical area selectable by a user.

35. A method for controlling a television signal processing apparatus having an emergency alert function, comprising:

using a first tuner of the television signal processing apparatus to tune a first signal indicating a first emergency event while the television signal processing apparatus is in a first off/standby mode;

using a second tuner of the television signal processing apparatus to tune the first signal indicating the first emergency event while the television signal processing apparatus is in a second on mode; and switching the television signal processing apparatus from said first off/standby mode, in which the first tuner tunes said first signal indicating a first emergency event, to said second on mode, in which said first tuner tunes a second signal having at least one of an audio and video component and the second tuner tunes the first signal indicating the first emergency event.

36. The method of claim 35, further comprised of enabling an alert output responsive to at least one of the first signal indicating the first emergency event and the first signal indicating a second emergency event.

* * * * *